United States Patent [19]

Kelly

[11] Patent Number: 5,402,848
[45] Date of Patent: Apr. 4, 1995

[54] METHOD AND APPARATUS FOR CONDUCTING ENVIRONMENTAL PROCEDURES

[76] Inventor: Leo G. Kelly, N6324 Hwy. W, Winter, Wis. 54896

[21] Appl. No.: 224,256

[22] Filed: Apr. 7, 1994

[51] Int. Cl.⁶ .................... E21B 43/34; E21B 43/04
[52] U.S. Cl. .................... 166/266; 166/267; 166/278; 166/51; 52/20
[58] Field of Search .......... 166/266, 278, 369, 268, 166/51, 67; 210/170; 52/20; 454/48

[56] References Cited

U.S. PATENT DOCUMENTS

| | | | |
|---|---|---|---|
| 3,394,645 | 7/1968 | Acker | 454/48 |
| 3,727,686 | 4/1973 | Prates et al. | 166/266 |
| 4,203,686 | 5/1980 | Bowman | 52/20 X |
| 4,890,673 | 1/1990 | Payne | 166/266 |
| 5,010,957 | 4/1991 | Kenner | 52/20 X |
| 5,082,053 | 1/1992 | Bernhardt | 166/67 X |
| 5,143,607 | 9/1992 | Bernhardt | 166/278 X |
| 5,171,104 | 12/1992 | Bernhardt | 210/170 X |
| 5,220,958 | 6/1993 | Bernhardt | 210/170 X |
| 5,281,333 | 1/1994 | Berhardt | 210/170 |
| 5,318,698 | 6/1994 | Bernhardt | 210/170 X |

Primary Examiner—Ramon S. Britts
Assistant Examiner—Frank S. Tsay
Attorney, Agent, or Firm—Ryan, Kees & Hohenfeldt

[57] ABSTRACT

A sparging well borehole has a single pipe extending downwardly in it. The lower end of the pipe terminates in the saturated zone and has orifices for discharging pressurized gas, usually air, which is injected into the saturated zone to liberate volatiles. A layer of impervious material is in the bore hole above the orifices and the hole is filled to the top from above the impervious layer with a porous material. A dome is positioned at the upper end of the borehole with an opening in the dome over the borehole. The dome is connected to a vacuum source to cause the vapor that is produced in the saturated zone and that is induced to migrate through the vadose zone and permeate the porous material in the borehole to be accumulated in the negative pressure interior of the sealed dome and collected for treatment by way of a piping system.

20 Claims, 4 Drawing Sheets

METHOD AND APPARATUS FOR CONDUCTING ENVIRONMENTAL PROCEDURES

BACKGROUND OF THE INVENTION

The invention disclosed herein pertains generally to environmental contaminant discovery and treatment technology and, in particular, to a new and improved vapor sparging and collection well construction and a method of using the well in connection with monitoring ground water conditions.

Conventional sparging wells comprise a well shaft or a borehole made in the earth. One of two pipes extends from ground level down the shaft and terminates in an outlet to provide for injecting a pressurized gas such as air, oxygen or carbon dioxide into the water table for the purpose of developing gaseous bubbles that entrain, for example, contaminants, such as fuel oil, gasoline, lubricating oil, chlorinated hydrocarbons, transformer dielectric liquids and a host of other volatile chemical compounds that have permeated the soils at and above the water table as a result of ground spills or leaky tanks, for example. The sparging gas injected into the water table percolates up and through the capillary fringe and vadose soil and volatilizes the dispersed pressurized gas is distributed in the vadose zone above the water table in a slightly pressurized state. In the widely used conventional sparging wells, another pipe, that is, a suction pipe is also directed downwardly from the manway chamber at the upper part of the well. Since the conventional vapor sparging well shaft is an uncased hole drilled in the ground to the water table, a region above the water table in the well shaft and above the discharge end of the gas injection pipe, is sealed off with impervious grout. The grout extends upwardly in the well shaft to about the level where intake orifices of the suction pipe begin. This prevents the contaminated vapor from short circuiting up the well shaft and causes it to be diverted through the vadose zone to the suction pipe intake. Hence, contaminated vapor, as it is usually called, must follow a path through the vadose that is generally concentric to the well shaft before the gases can reach the suction pipe. This results in the suction or negative pressure having an effect in the vadose zone or ground at some radial distance from the well shaft. It is desirable for the negative pressure or suction effect to extend to the greatest area possible around the collection well.

One of the problems of a conventional and essentially standardized sparging well such as the one outlined above is that it lacks versatility. That is, it is not readily adaptable to operating in a solely pressure input mode, nor solely in a suction mode, and, therefore, it is not a good candidate for use in arrays or networks of interconnected wells wherein it would be highly advantageous to have one or more wells functioning in the gas sparging source mode, one or more wells acting in the contaminant collection mode and possibly other wells acting in sparging gas sourcing and vapor collection modes, alternately, or independently.

Another of the deficiencies of conventional sparging wells is that ground surface liquids can easily enter the well through the manway, which is a space at ground level for accessing the top of the well. Because of the vacuum or negative pressure condition created, these contaminants can be drawn down into the well borehole and render the well useless or ineffective. Another deficiency is the limited zone and area of influence, which is confined to the distance between the well pipe terminations and the points within the well vertically.

SUMMARY OF THE INVENTION

The new sparging well disclosed herein comprises a borehole, or well shaft, drilled through the earth or vadose zone for terminating in the saturated zone beneath the top of the water table which by itself is not new. According to the invention, however, a dome extends downwardly from the top of the well shaft into the vadose zone and allows a negative pressure from the top of the borehole down the entire depth of the well to the sealed off area separating the two zones of the well. The dome, in this new concept is preferably a polyvinyl chloride or metal cylinder whose lower end that extends into the well shaft is open for influx of vapor and whose top end is provided with a closure for closing and accessing it. The top end of the cylindrical dome extends into the manway skirt above the dome manway seal. Removal of the threaded closure at the top of the dome provides access to the interior or chamber within the dome to accomplish various tasks, including sampling. The body of the dome, being impervious, of course, and having a stabilizing sealant around it such as concrete or bentonite inhibits surface water from being drawn into the underside of the dome. A single pressurized gas or air injection downpipe extends down the well shaft with its lower air discharging end terminating below the top of the water table. The top end of the air injection pipe is connected in a clear space inside of the dome, rather than extending into the manway as in conventional wells. The suction pipe which is used in the standard or conventional sparging well, is eliminated in the new design to thereby reduce material costs and the complexity of constructing a well using two downpipes.

The preferably cylindrical wall of the dome is provided with knockout openings or pipe ports which allow connections to vacuum and pressure source piping and between domes in sparging well arrays or networks. Those ports when not in use in a particular well are plugged. The ports allow connecting pipes which can run in any of the four cross directions and at angles therebetween to or from a dome. An axially extending portion at the lower end of the dome and a considerable length of the well shaft contiguous with and below the dome is filled with porous material that is capable of allowing entry of the vapor over the entire length of the well through the vadose zone such that the collected vapors enter through the open bottomed dome are drawn into the dome under the influence of the negative pressure or suction effect which exists in the dome itself. If the chamber in one dome is at negative pressure, that dome can be readily connected by way of piping to other domes for sparging wells at some distance from the one under consideration or in an array or network of such wells so that the domes in all of them are subjected to vacuum or negative pressure as a result of the one dome being connected to a vacuum source. Similarly, pipes can be taken through the ports of the dome after having been connected to the compressed air infeed pipe that supplies the air injection pipe of the dome under consideration, and is connected by pipes passing through and isolated from the sealed ports of other sparging well domes in an array of wells, and controlled separately, at each dome.

The new sparging well construction and operational modes outlined above achieves the objectives of eliminating one of the two downpipes used in conventional sparging wells, eliminating ground water invasion of the well, eliminating pipe entry under the skirt and into the manway, trapping the lines and invading the seal area around the inside of the manway at the well head, improving versatility of the well by facilitating making the connections in or by way of the dome for enabling the well to be operated in the vapor collection mode or in the air injection mode or in both modes, and reducing the cost of well construction. The allows unlimited access for sampling water or air without interrupting the pipe connections.

How the foregoing objectives and features of the new sparging well are achieved will be evident in the ensuing description of an illustrated embodiment of the new well which will now be set forth in reference to the accompanying drawings.

DESCRIPTION OF A PREFERRED EMBODIMENT

Figure 2:
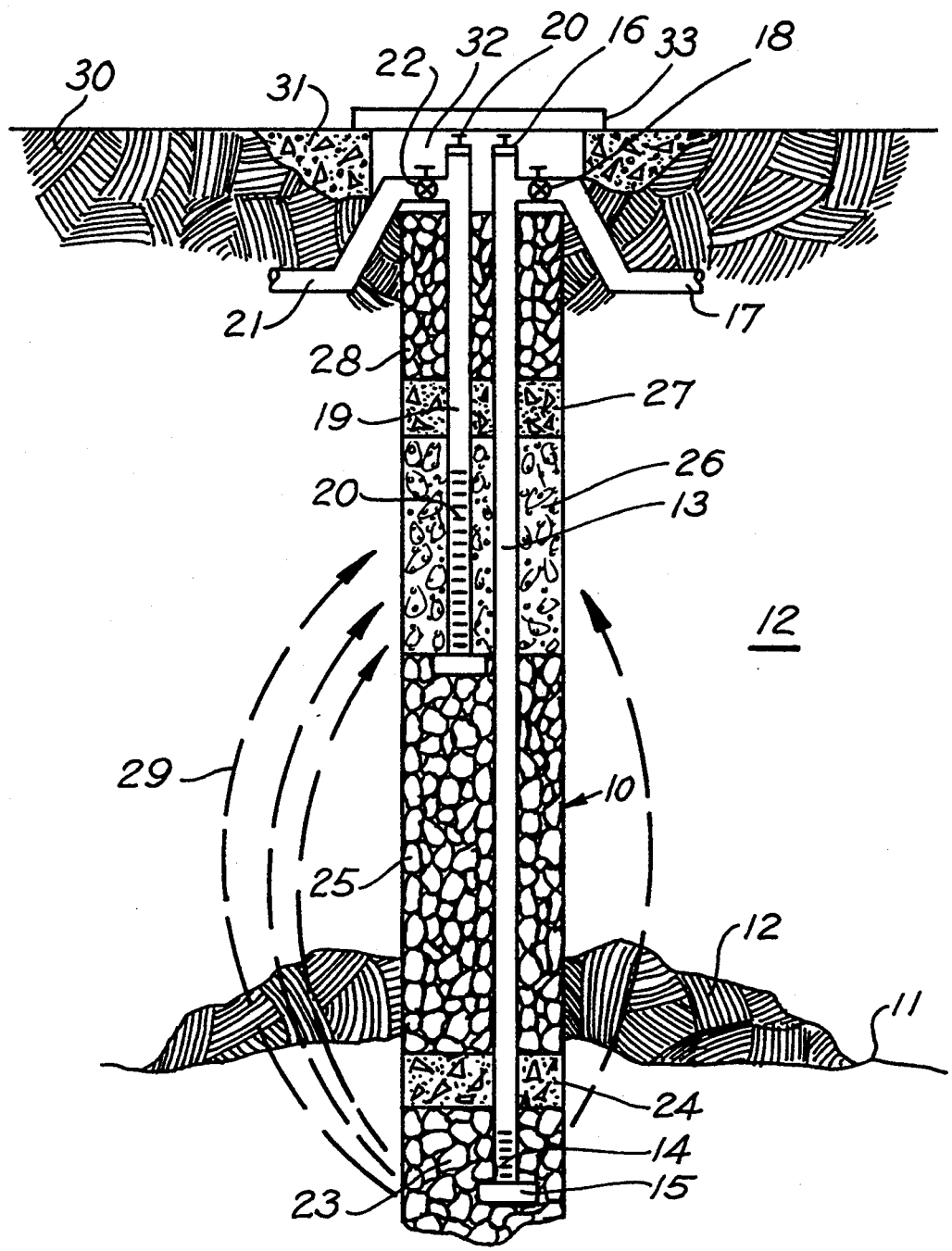
FIG. 2 is a vertical cross section of a conventional or prior art sparging well.

Before entering into a detailed discussion of the new well construction and usages, attention is invited to FIG. 2 for a brief description of the diagram of a widely used standardized or conventional sparging well.

In FIG. 2 the well borehole into the earth is indicated by the numeral 10. The borehole extends below the water table which is marked 11. The vadose or ground above the water table extending to the top of the well is identified by the numeral 12. The air injection downpipe for the well is marked 13. The lower end of the downpipe has a series of orifices 14 through which pressurized air discharges into the water table. A plug 15 closes the lower end of the air injection pipe 13. The upper end of the pressurized gas or air delivery pipe 13 has a plug 16. The pressurized air infeed pipe 17 makes a T-connection with the downpipe and the infeed pipe is provided with a valve 18. The valve can be closed if it is desired to inactivate the well. Also, extending downwardly in the well shaft is a vapor collection suction pipe 19. The lower end of suction pipe 19 is provided with slits 20 or by a screen, not shown. The upper end of collection pipe 19 is provided with a plug 20 for accessing the pipe, if desired. Pipe 19 connects with a pipe 21 that leads to a vacuum or suction source, not shown. A valve 22 is usually provided in the suction pipe. The lower end, of the well shaft in the vicinity of the pressurized air discharge orifices 14 is surrounded by a porous material such as gravel 23. A sealant 24 that inhibits upward drifting of pressurized air in the well shaft is usually composed of bentonite material. This material is a decomposed volcanic ash which has the property of absorbing substantial quantities of water and swelling to be self-compacting. Immediately above sealant 24 which isolates the lower end of the well, there is a water impervious grout 25. Above this material there is a porous or water and vapor pervious material such as gravel 26. The vapor pervious zone 26 is sealed off at its top by another bentonite layer 27. The uppermost part of the well shaft is filled with vapor and water impervious grout 28.

As discussed earlier, the prior art sparging well necessarily causes vapor and entrained contaminants to be produced by the pressurized air which forms a multiplicity of small bubbles in and around the gravel filled zone 23 at the lower end of the well shaft and below the water table. The bubbles created are composed of water and any volatile contaminants which are present in and above the water. The vapor follows the path indicated by the dashed arrowheaded lines, one of which is marked 29. It will be evident that the vaporized volatiles surround the well shaft on their way to the collection pipe suction orifices 20, but they must all converge on a relatively small diameter eccentrically positioned pipe 19 from all sides of the pipe.

The ground surface 30 from which the well shaft is drilled is provided with an annular concrete insert 31 which defines a manway space 32. The manway is usually provided with a cover 33. The purpose of the manway is to provide access to the valves and plugs at the well head. As mentioned earlier, the manway used in conventional sparging wells such as in FIG. 2 disadvantageously allows surface water to filter into it and to eventually permeate the grout 28 region and then follow down the pipe to the porous zone 26 where it can be drawn into the collection suction pipe 19 for undesirably mixing or contaminating the vaporized volatiles which the well is supposed to be collecting from the water table.

Figure 1:
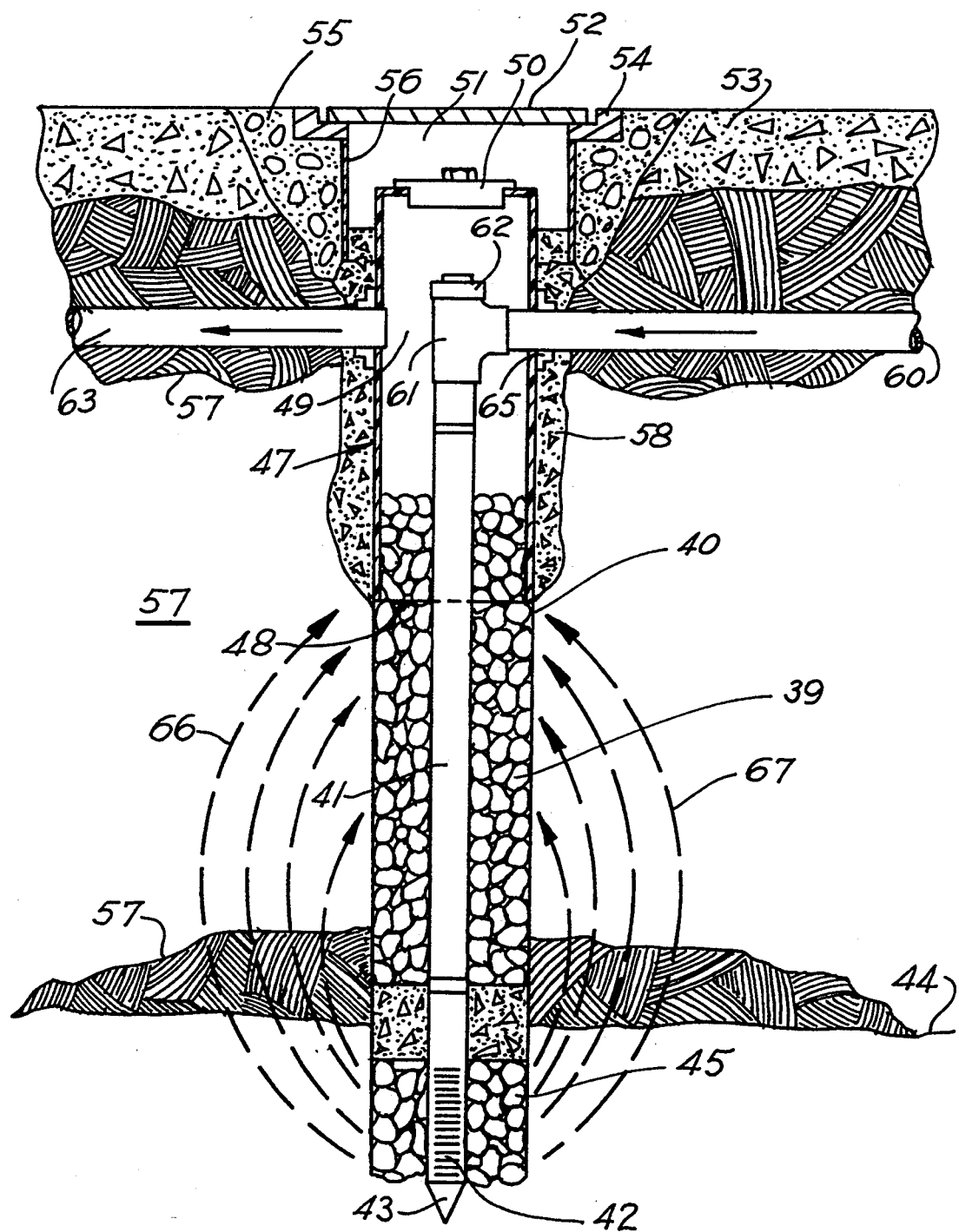
FIG. 1 is a vertical section of the new domed well connected presently for operating in the mode wherein it provides for injecting air or other gas into the water table and for collecting in the dome the vapor liberated from the water table up into the dome by having the interior of the dome at negative pressure.

A diagrammatic view of the new domed well is shown in FIG. 1. The well shaft, or borehole, in FIG. 1 is designated by the numeral 40. The well shaft contains only one centrally located air injector pipe 41 which is called a downpipe herein for convenience. This downpipe is preferably composed of PVC. The lower end of the pipe is provided with a multiplicity of slots or discharge orifices 42. The gas, usually air, discharge region in the lower end of the well borehole is filled with a coarse packed gas pervious gravel 45. A liquid impervious or sealing layer, typically composed of bentonite or neat cement 46, is formed at about the water table level so that the fine vapor bubbles which are formed as the gas pressure permeates the water table from the porous gravel 45 are not short circuited up the well shaft. Since air is usually the greater component of the gas the word "air" will be used to designate it hereafter.

In the space above sealing layer 46, the well shaft is filled with a porous gravel 39 into which bubbles of vapor which are produced by the discharge of the pressurized air can permeate for traveling up the well shaft. The upper end of the well shaft contains the new dome which is designated generally by the numeral 47. The dome may be metal but is preferably composed of PVC or other non-corrosive material. The dome 47 is preferably cylindrical although its cross section can be shaped differently, too. The hollow dome 47, as illustrated in FIG. 1 has an open lower end 48. The porous gravel fill 40 in the shaft extends into the interior of dome 47 sufficiently to leave a free space or chamber 49 in the dome. The dome is provided with a schematically represented plug or closure 50. When it is closed as is the case when the well is active, the closure isolates the interior chamber 49 of the dome from the manway space 51. The cover 52 of the manway is flush with ground level 53. The cover is set in a hard sealing material 54. The manway space 51 is comprised of poured concrete 55 which contains an annular sleeve 56 that defines the walls of the manway space 51. The material 53 at ground level may be asphalt paving or crushed rock, for example, the vadose is represented by the hatched area marked 57. The body of dome 47 is isolated from the manway and surrounding ground by a layer of sealant 58 which may be bentonite, neat cement or other suitable material.

The sparging well in FIG. 1 is presently set up to operate in the pressurizing and vapor collecting mode of the several modes in which it can function. In FIG. 1, pressurized gas is fed into air injector downpipe 41 through a lateral pipe 60 which can be PVC. In this case, pipe 60 connects to a Tee fitting 61 that has one branch connected to downpipe 41 while the other branch is closed with a cap 62. The removability of the lid or closure 50 and cap 62 is useful for lowering a sampling vial, not shown, in the downpipe 41 to the water table to take a direct sample of the water. Pressure infeed pipe 60 passes into the dome through a water tight gland which is generally designated by the numeral 65 and will be discussed in detail later in reference to FIG. 5. The suction pipe 63 in FIG. 1 is open to dome chamber 49 for developing a corresponding suction or negative pressure in that chamber. Suction pipe 63 is, of course, connected to a vacuum source, not shown. This pipe passes into the dome through the same type of gland that is indicated by the numeral 65.

Assume now that pressurized air is being forced downwardly in pipe 41 and emerges from the orifices 42 which are below the water table. As alluded to earlier, the air that enters the water table induces development of a multiplicity of fine bubbles or vapor which have the capability of entraining volatile contaminants, if any, in and above the water table. The direction of vapor flow is suggested by the arrowheaded dashed lines such as the line marked 66 and 67. The regions embraced by the lines 66 and 67, for example, in the vadose are under the influence of pressure from below and suction from above. As a result, contaminants entrained in bubbles or vapor are forced and also drawn into the gravel filling 40 of the borehole from which the vapor permeates through the large bottom opening 48 of the dome into the chamber 49 of the dome. The vapor is then drawn out of chamber 49 in the dome through suction pipe 63 for collection for treatment and sometimes analyzed. The merit of having a pressurized air injection down pipe 41 centered in the well should now be evident. The vapor transmissive gravel 40 can now be symmetrically distributed around the downpipe and, looking at it from the other direction, symmetrically distributed around the inside of the borehole. As a consequence, the vacuum induced through the bottom opening 48 of the dome causes symmetrical lines of travel 66 and 67 for the vapor to occur about the borehole. This is not possible in the prior art designs where an air pressure feed pipe is offset from the center of the borehole on one side and the vapor collection pipe is offset from the center of the borehole on the other side. The suction influence obtainable with the new domed sparging well is through about a five meter radius measured from the center of the downpipe into a surrounding vadose of average soil density.

Figure 3:
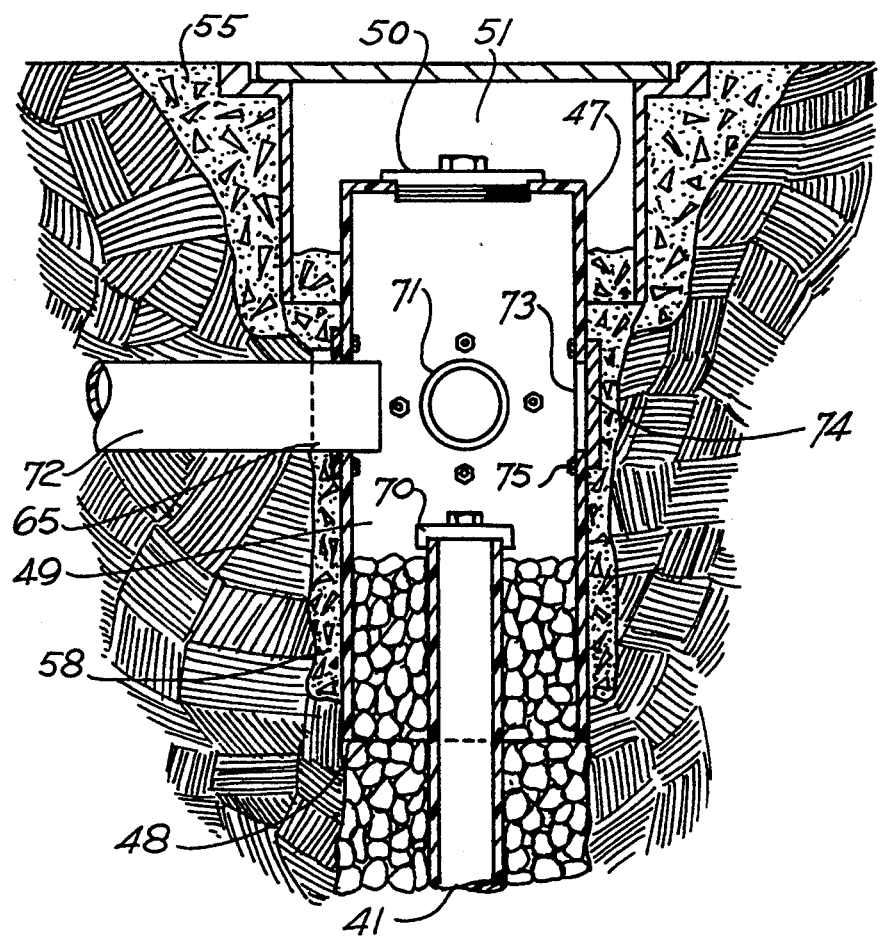
FIG. 3 is a more developed view of the upper end of the new domes sparging well depicted in FIG. 2 but wherein the well is functioning solely in the vapor collecting mode.

Attention is now invited to FIG. 3 where the new sparging well is set up to function in another one of its modes. In this example, the pressurizing downpipe 41 is disconnected and closed with a cap 70. Suction pipe 72 is inducing negative pressure or vacuum in chamber 49 of dome 47. A pipe whose end 71 enters the dome chamber 49 passes through a gland 65, not visible, in FIG. 3. The open-ended pipe 71 can be connected to a dome associated with another well which might be functioning in the same mode as the set up in FIG. 3 such that the pipe 71 and the other dome to which it connects are exposed to the vacuum or negative pressure created in the chamber 49 of the dome depicted in FIG. 3. The suction pipe 72 is thereby capable of inducing negative pressure or vacuum in not only the chamber 49 in FIG. 3 but in a plurality of other chambers which may be arranged in a circle, for example, around a centrally located well, not shown in FIG. 3, which has its pressurizing downpipe activated as in the FIG. 1 example. Suction pipe 72 enters through a port in the wall of dome 47 in sealed fashion through a gland 65 of the type that is exhibited in FIG. 5.

It should be noted that the dome 47 in the FIG. 3 example has several holes or ports through its wall for accommodating other pipes that enter through a gland. In FIG. 3 one of the presently unused ports 73 is blocked by a knockout plate 74 that is fastened over the port by means of bolts such as the one marked 75. Thus, it is demonstrated that domes can be connected or not connected with other domes in networks or arrays of sparging wells by simply selecting which ports are to contain pipes and which are to remain closed.

Figure 4:
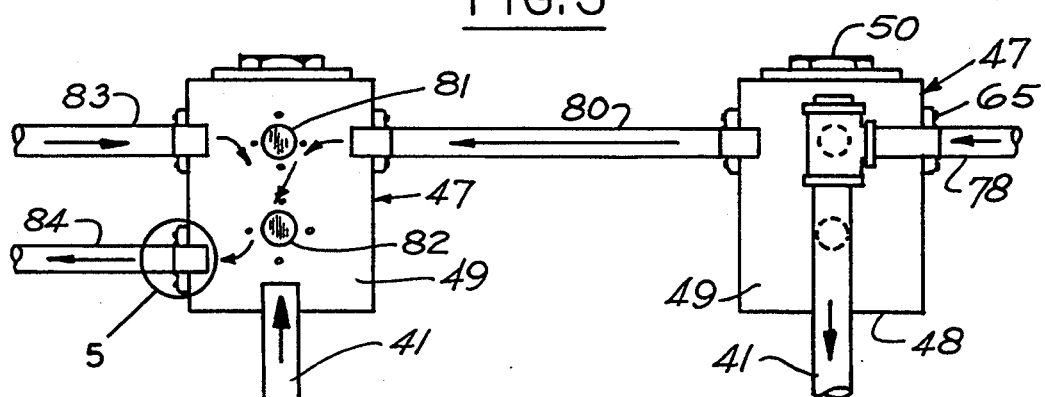
FIG. 4 is a diagram of spaced apart domes of sparging wells, without showing the well shafts, where the domes are connected for performing in different modes in vapor consolidating collection system.

FIG. 4 illustrates domes of the new sparging well connected in a vapor consolidating collection system or network. In this Figure, the dome 47 at the right is connected to an air pressure input line 78 and enters dome 47 through a gland 65. By way of a Tee 79 the pressurized air input pipe 78 is connected to downpipe 41 which, as explained earlier, extends into the water table. The vapors enter the chamber 49 through porous material 39 and the open bottom of the dome in which negative pressure prevails. Hence, by reason of an interconnecting pipe 80, negative pressure also prevails in the space 49 in the left dome 47. Two of the ports 81 and 82 are presently blocked and not used. However, it should be noted that the downpipe 41 in the leftmost dome 47 which usually injects pressurized air down to the water table now becomes a vapor collecting pipe because it opens to chamber 49 which is subject to suction or is at negative pressure. In the same arrangement, vapor is brought into chamber 49 in the left dome 47 through another pipe 83 which may be directly and indirectly connected to other chambers that are functioning as vacuum chambers in other domes in a network. Thus, only one downpipe 84 needs to be connected to the vacuum source or negative pressure to create a vacuum in several domes. When desired a plug is inserted into the pipe opening to prevent the vacuum from influencing any of the wells.

Figure 5:
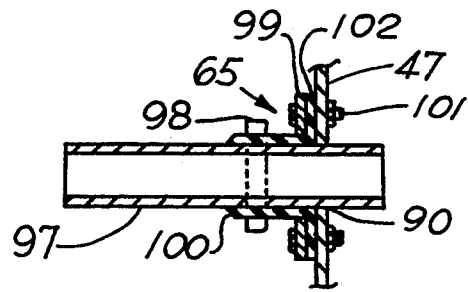
FIG. 5 is a cross section of the device by which a pipe may be connected and sealed to a dome.

In FIG. 5, the details of one of the glands 65 through which pipes enter and leave domes is shown in detail. Assuming, that the port hole 90 in the wall of the dome cylinder was previously covered with a knockout plate 74, the plate has been removed and a pipe 97 is now passing into or out of dome 47. Before the pipe is inserted through port 90, a boot clamp 98 similar to a pipe clamp, is slid over the end of pipe 97. Next, a clamping ring 99 is slid over the pipe. This is followed by passing a rubber boot 100 over the pipe. With these parts mounted on the pipe, it is passed through port hole 90 and bolts 101 are passed through suitable holes in clamping ring 99 and aligned holes in the wall of dome 47. This clamps the radially extending flange portion 102 of the boot to the wall 147 to effect a water-tight and air-tight seal. The last step is to tighten clamp 98 onto the body 100 of the boot to prevent leakage along the surface of the pipe 97.

Figure 6:
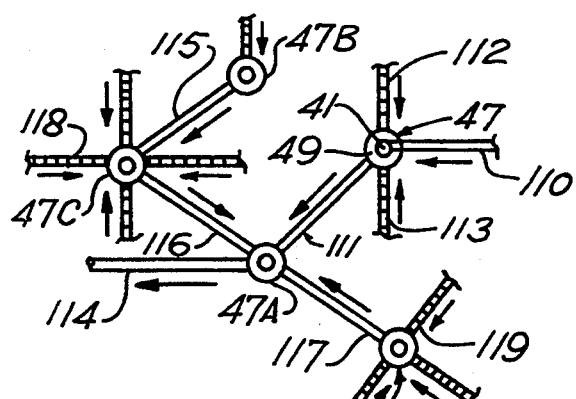
FIG. 6, 7 and 8 are diagrams of some of the many sparging well arrays or networks that can be arranged using the new domed well.

FIG. 6 depicts a network of sparging wells wherein only one of the domes 47, excluding domes 47A–47D, has pressurized air delivered to its vertically extending air injection pipe 41 from an air pressure input pipe 110. The chamber of dome 47 is under vacuum or negative pressure by reason of being connected to a pipe 111 which is at negative pressure. The dome 47 is performing three functions. It is delivering pressurized air through downpipe 41 to below the water table. It is also collecting vapor in its evacuated chamber 49. It is also drawing vapor from near the surface of the ground through laterally extending perforated pipes such as the two marked 112 and 113 to accumulate shallow soil vapor contamination.

Dome 47A functions solely as a collecting dome in this case. Its air injecting downpipe is blocked off at it top. The dome is the only one in this array that connects by way of a pipe 114 that leads to vacuum source, not shown. Pipes 115, 116, 117 and previously mentioned 111 connect all of the other domes together and are all under vacuum by reason of connecting to the common dome 47A of one of the sparging wells. Domes 47C and 47D all have perforated lateral pipes extending from their evacuated chambers such as the pipes marked 118 and 119. Thus, in FIG. 6, a minimum number of wells is provided for withdrawing vapor from a relatively large area. Most of the domes are simply functioning as domes per se without their pressuring pipes being active. However, it should be understood that a good reason for having all of the wells provided with the capability of performing any of the functions is that it is advantageous to switch the system so that one or more of the wells will function as air injection wells while others will be adapted to act as simply vacuum vapor collection wells or as combination air injection and vapor collection wells, and influence a greater area to reach out and provide overlapping other well zones of influence.

Figure 7:
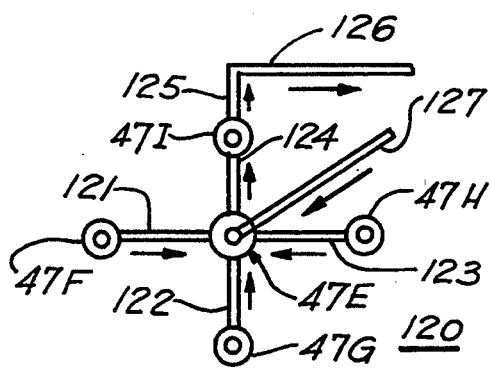

FIG. 7 is a diagram of an array of sparging wells adapted for collecting vapor from a large area. Here, the dome marked 47E is performing in conjunction with the well beneath it in the pressurized air injection mode and in the vapor collection mode. The dome 47E is connected by means of vacuum conducting pipes 121, 122, 123 and 124 so that domes 47F, 47G, 47H and 47I are all serving at the present time as evacuated vapor collection domes. Dome 47I is connected by way of a pipe 125 to suction pipe 126. Pressurized air is fed from infeed pipe 127 only to the downpipe in dome 47E.

Figure 8:
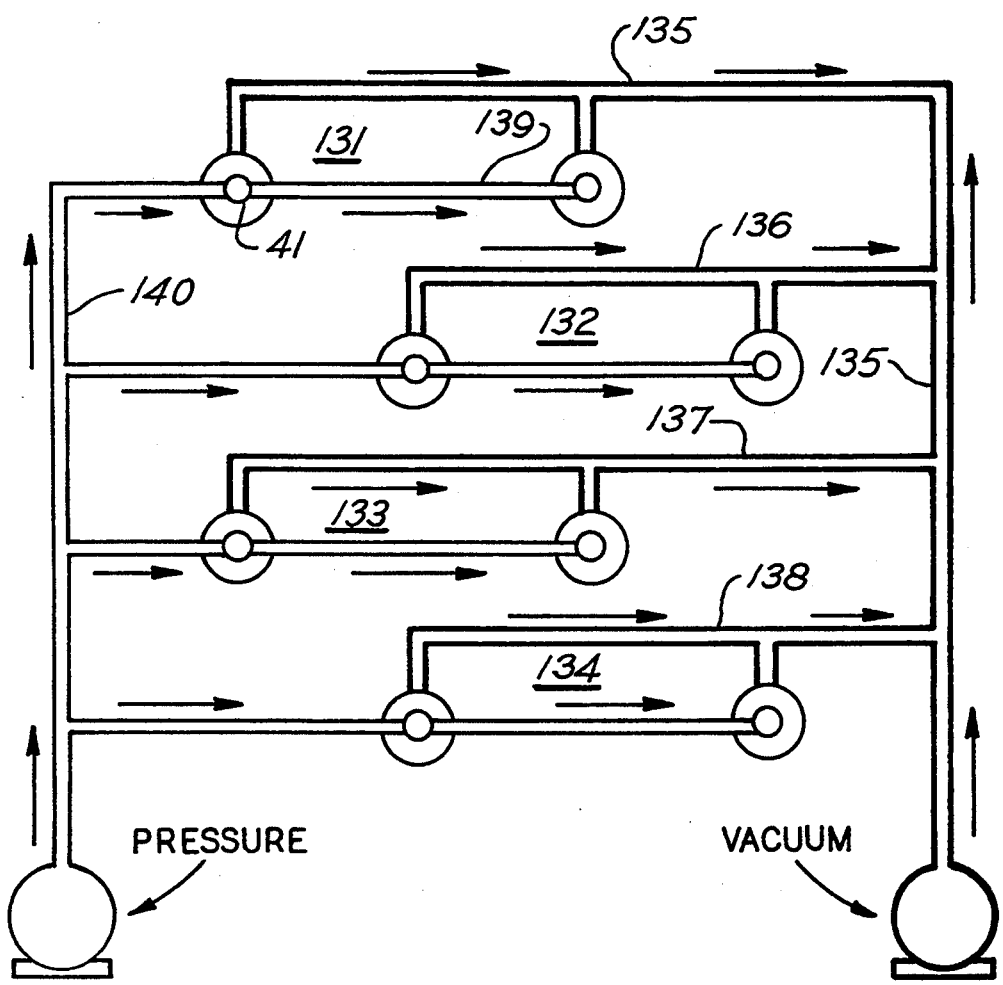

An array of wells for covering an area with half as many wells, as would be required to influence the zones if the prior art sparging wells were used, is depicted in FIG. 8. Here, the sparging wells are arranged in a plurality of rows, that is, in four rows 131, 132, 133 and 134. A common header pipe 135 provides the vacuum to all of the domes associated with the wells, all or any of which can be connected or disconnected from the system by simply plugging the outlet pipe in the dome. Header pipe 135 connects the input to a vacuum source 136. It should be understood that the vacuum source in this figure and the source referred to in connection with the other figure showing arrays of wells must lead to some device, not shown, that permits sampling of the vapors recovered or that condenses or treats the contaminants in the vapors. Several technologies are available and in use to recover or eliminate the volatile contaminants in the vapors, or treat the vapors for discharge to the environment.

Continuing with a discussion of FIG. 8, it will be observed that there are vacuum header pipes 135, 136, 137 and 138 connected to the domes for each well in the rows. Also, typically as in the domes in row 131 the air injection downpipes 41 are all connected together and all of the air injection pipes 41 are thereby connected to a header pipe 140 which is pressurized by a pump 141. The arrangement in FIG. 8 can impose an intense collection action on a substantial area with a minimum number of wells in use and with a minimum amount of piping being required.

I claim:

1. A sparging well wherein a borehole in the earth has a lower end for extending into the fluid saturated zone of the water table and has an upper end proximate to the surface of the earth, a dome having a wall arranged at the upper end of the borehole for defining an interior chamber, the dome having a bottom opening presented to the borehole for vapor to pass from the borehole to the dome, only one downpipe extending downwardly in the borehole, said pipe having an upper end in the dome and a lower end extending into the saturated zone, said lower end of the pipe having one or more orifices for injecting pressurized gas below the water table surface, a first porous filler material layer in the borehole around the lower end of the downpipe for distributing the gas into the saturated zone in the vicinity of the borehole, a fluid impervious layer in the borehole around the pipe and overlaying said first porous material layer, and a second porous filler material layer filling said borehole upwardly from said impervious layer at least to the bottom opening of the dome to provide for vapor resulting from injection of gas into the saturated zone to enter the dome from the vadose surrounding the borehole through the second porous layer of filling material.

2. The sparging well according to claim 1 wherein said dome has an upper end that extends into a manway formed in the earth above the dome to provide for accessing the dome through the manway.

3. The sparging well according to claim 1 wherein said dome has an upper end that extends into a manway formed in the earth above the dome to provide for accessing the dome through the manway and said dome has a removable closure presented in the manway to provide for accessing the chamber of the dome.

4. The sparging well according to any one of claims 1, 2, or 3 wherein the dome is a hollow cylinder arranged substantially coaxially to the upper end of the borehole.

5. The well according to any one of claims 1, 2, or 3 wherein the wall of the dome has at least one opening and at least one removable closure device for closing the opening,
   said closure device or devices being removable to permit insertion of a pipe or pipes, respectively, into the dome.

6. The sparging well according to any one of claims 1, 2, or 3 including a conduit for supplying pressurized gas, said conduit passing sealingly through the wall of the dome, and means for connecting the conduit to the upper end of the downpipe within the chamber of the dome.

7. The sparging well according to any one of claims 1, 2, or 3 including a suction conduit passing sealingly through the wall of said dome and having an opening in said dome for effecting a negative pressure in the dome, and means for plugging the upper end of said downpipe in the dome.

8. The sparging well according to any one of claims 1, 2, or 3 including a suction pipe passing sealingly through the wall of said dome and having an opening in said dome for effecting a negative pressure in the dome,
   a conduit for supplying pressurized gas and passing sealingly through the wall of the dome, and
   means for connecting said conduit for supplying pressurized gas to the upper end of said downpipe in the dome.

9. An array of sparging wells corresponding with the sparging well defined in claim 1, said wells being spaced from each other in the earth,
   at least one of the wells provided with a supply conduit for supplying pressurized gas, said supply conduit passing sealingly through the wall of the dome,
   means for connecting the supply conduit to the upper end of said downpipe in the dome,
   at least one other of the wells having a suction conduit passing sealingly through the wall of the dome and having an opening in said dome for effecting a negative pressure in the dome, and
   means for plugging the upper end of the down pipe in said other well.

10. An array of sparging wells corresponding with the sparging well defined in claim 1, said wells being spaced from each other in the earth,
    at least one of the wells provided with a supply pipe for supplying pressurized gas, said supply pipe passing sealingly through the wall of the dome,
    means for connecting the supply pipe to the upper end of the downpipe in the dome,
    at least one other of the wells having a suction conduit passing sealingly through the wall of the dome and having an open end in the dome for effecting a negative pressure therein,
    a suction pipe sealingly connected to the chamber of the dome of said at least one other well to at least one additional of a well for extending said negative pressure to the said additional chamber.

11. The array of sparging wells according to claim 10 including pipes sealingly interconnecting one or the other or both of the chambers of the dome of said one other well and the dome of the additional well to more additional wells for propagating said negative pressure to the chambers in the domes of the additional wells.

12. The array of sparging wells according to claim 10 wherein the upper end of the downpipe in at least one of the wells is open for propagating the negative pressure in the dome of the well to the lower end of the downpipe.

13. The array of sparging wells according to claim 10, wherein an interconnecting pipe also connects to the supply pipe in the chamber of the at least one well, and the interconnecting pipe passes out sealingly through the wall of said one well and passes sealingly through the wall of the dome of an additional well, and including
    means for connecting the interconnecting pipe to the downpipe of said additional well.

14. The array of sparging wells according to any one of claims 10, 11, 12, or 13 including a perforate conduit having an end opening in communication with the chamber of a dome in which negative pressure prevails, said perforated conduit extending laterally from the dome.

15. An array of sparging wells corresponding with the sparging well defined in claim 1, the wells being arranged in the earth in rows with the wells in any row being staggered relative to wells in the adjacent row,
    a main gas supply pipe extending transversely of the rows of wells, and a source of pressurized gas to which said supply conduit is connected,
    pipes passing sealingly from the chamber of one dome to another in the respective rows for connecting the downpipes in the domes of the rows together and to said main gas supply pipe,
    a main suction pipe extending transversely to the rows of wells and a vacuum source to which the main suction source is connected,
    pipes passing sealingly from the chamber of one dome to another for connecting the chambers of the domes in the rows together and to said main suction conduit for effecting negative pressure in the chambers of the domes.

16. A method of collecting vapor from below the saturated zone in the earth using a sparging well comprising the steps of:
    providing a borehole in the earth that extends into the saturated zone,
    having a downpipe in the borehole with the lower end of the pipe having orifices and extending into the saturated zone,
    blocking the borehole above the lower end of the pipe, with an impervious material layer,
    positioning a dome at the upper end of the borehole with an opening in the dome presented toward the borehole,
    applying pressurized gas to the downpipe for injecting the gas below the water into the saturated zone to produce vapor that rises through the vadose zone and enters the borehole for being collected in the dome.

17. The method according to claim 16 including the step of effecting negative pressure in the dome to draw in the vapor.

18. The method according to claim 16 including having a plurality of the boreholes with domes arranged in spaced relationship relative to each other,
    having pipes interconnecting the domes and having at least one dome connected to a vacuum source for simultaneously developing negative pressure in the domes, and having the downpipe in one or more boreholes injecting gas into the saturated zone.

19. The method according to any one of claims 16, 17 or 18 including the step of filling the space in the borehole from the impervious layer to at least the opening in the dome with porous material before the dome is positioned.

20. The method according to claim 18 including arranging the pipes interconnecting the domes horizontally and having a plurality of openings in the pipes to propagate vacuum into shallow soil levels and under impervious covered or paved layers to collect vapors that have risen through the vadose and are captured under an impervious layer and are beyond the vertical capture range of a well.

* * * * *